March 31, 1936. T. TAKAHASHI 2,035,729
PNEUMATIC HAMMER TESTING MACHINE
Filed June 20, 1928 4 Sheets-Sheet 1
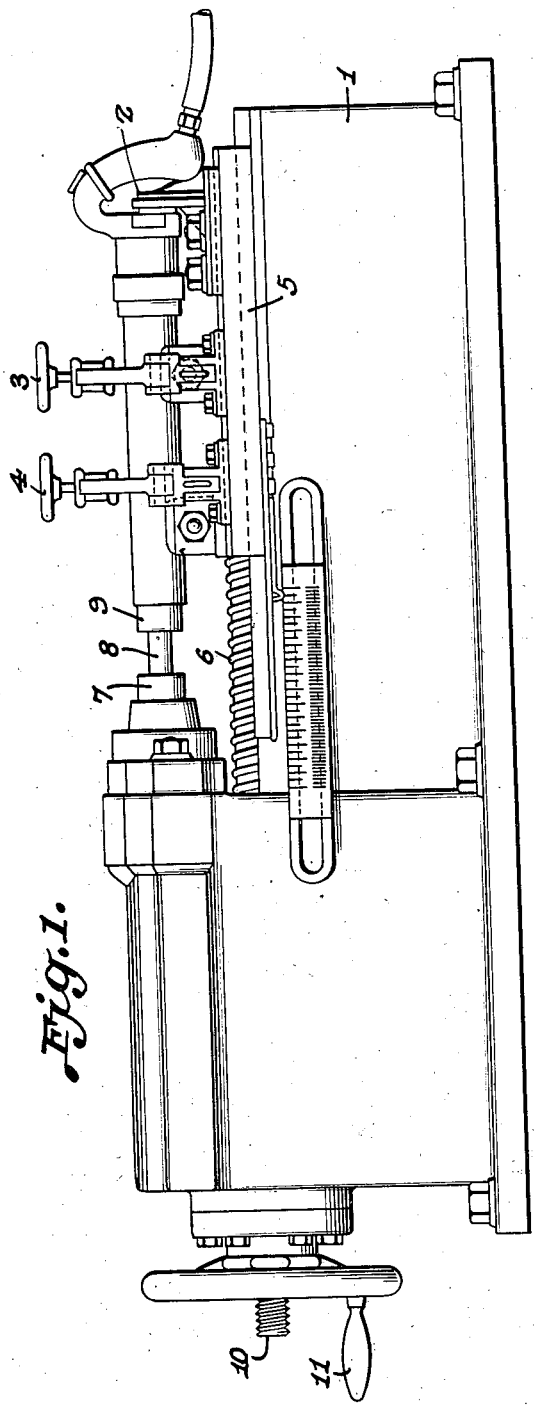
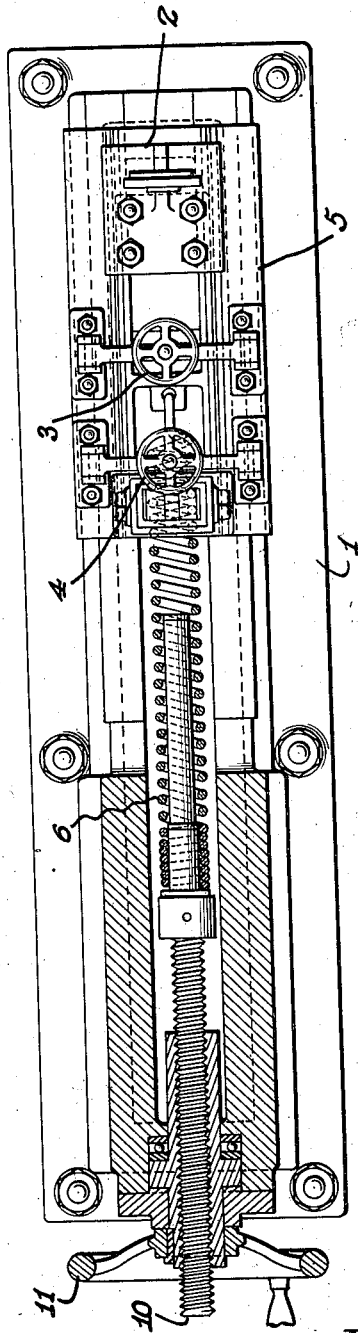
Inventor:
TATSUMI TAKAHASHI
By Richards & Geier
Attorneys March 31, 1936.  T. TAKAHASHI  2,035,729
PNEUMATIC HAMMER TESTING MACHINE
Filed June 20, 1928     4 Sheets-Sheet 2

INVENTOR
TATSUMI TAKAHASHI
BY Richards & Geier
ATTORNEYS

INVENTOR
TATSUMI TAKAHASHI
BY
Richards & Geier
ATTORNEYS

March 31, 1936.   T. TAKAHASHI   2,035,729
PNEUMATIC HAMMER TESTING MACHINE
Filed June 20, 1923   4 Sheets-Sheet 4
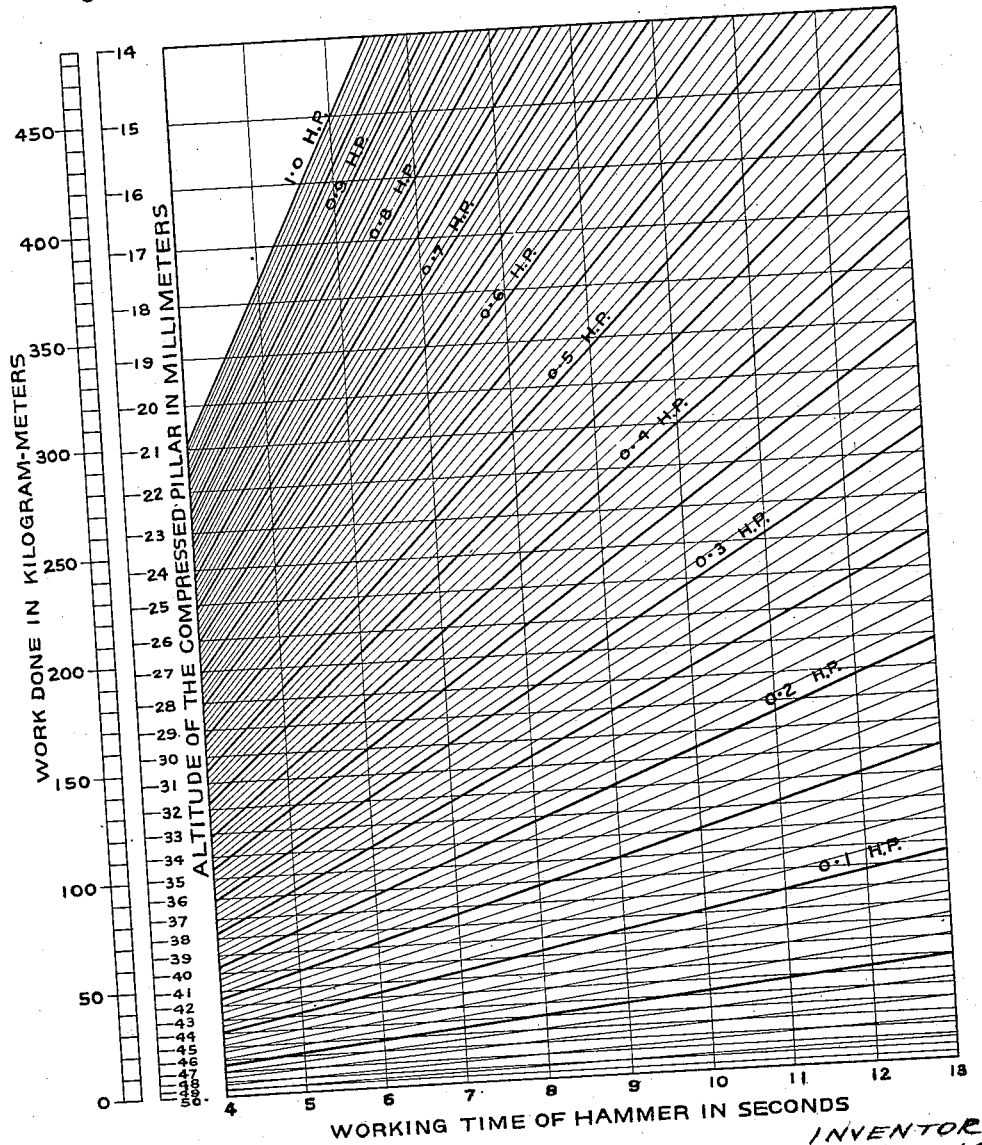

Patented Mar. 31, 1936

2,035,729

UNITED STATES PATENT OFFICE 2,035,729

PNEUMATIC HAMMER TESTING MACHINE

Tatsumi Takahashi, Higashi-ku, Osaka, Japan

Application June 20, 1928, Serial No. 286,753
In Japan June 20, 1927

1 Claim. (Cl. 73—51)

This invention relates to a device for testing a pneumatic hammer.

An object of the present invention is the provision of an equipment of a simple construction for determining with facility the effective horse power and the intensity of blows of a pneumatic hammer, besides measuring the number of blows and the intensity of recoils under the conditions as similar as possible to the actual work in the workshop.

The device costructed in accordance with the present invention comprises the following elements:

Hammer holders so arranged that the hammer to be tested is allowed to move in its axial line whilst being held by them.

A pushing plate by means of which the hammer is suitably pressed in the direction of its blows, forced by a spring.

A test piece holder, by means of which a test piece of a ductile material is supported in such manner that it is deformed by the blows of the hammer to be tested, said test piece holder comprising a fixed block fastened to the frame and a movable block movable in the direction parallel to the axial line of the hammer.

A recording instrument so arranged that a diagram of the oscillating motion of the hammer body may be automatically traced on a recording sheet as a function of time.

According to the invention, the effective horse power or the useful work exerted by a pneumatic hammer in a unit of time is measured by the plastic deformation of a test piece of a ductile material having a very low yielding point, said deformation being caused by continuous blows of the hammer during a certain unit of time. The number of blows and the intensity of recoils are determined by recording the oscillating motion of the hammer body, which motion is caused by the recoil action of the hammer.

The effective horse power or the useful work done by a pneumatic hammer can be easily found on an effective horse power chart, without any calculations whatsoever, merely by determining the time during which a hammer was tested in a device made in accordance with the present invention, and by measuring the length of the test piece deformed by the hammer, the number of blows and the intensity of recoils being shown by a diagram representing the oscillating motion of the hammer body and traced automatically by a recording instrument.

In accordance with a modification of the present invention, a test piece is fixed by a test piece holder in the direction parallel to the axial line of the hammer to be tested.

The test piece holder comprising a fixed block fastened to the frame and a movable block movable in the direction parallel to the axial line of the hammer, is arranged in such manner that the test piece inserted between these two blocks may be deformed by the continuous blows of the pneumatic hammer through said movable block.

The hammer to be tested is so mounted on the testing device by means of hammer holders as to be movable only in the direction of its axial line while held by them. The back of the hammer, is always pressed suitably in the direction of its blows by a pushing plate which is also arranged so as to be movable only in the direction parallel to the axial line of the hammer, the pressure of the pushing plate against the hammer being due to a spring the load of which is properly adjusted by the manipulation of a feed screw.

In this case the construction of the device for holding the test piece used for the determination of tension is different from that of the device holding the test piece used for the determination of compression.

Fig. 1 shows in elevation the general arrangement of an equipment applied to the measurement of the effective horse power of a pneumatic hammer by causing the deformation of a test piece by the continuous blows of the hammer.

Fig. 2 shows a plan view of the said equipment, partly in section, showing the details of an adjusting device for the spring.

Fig. 7 shows an effective horse power chart calculated on the basis of the diagram shown in Fig. 6.

Figure 3:
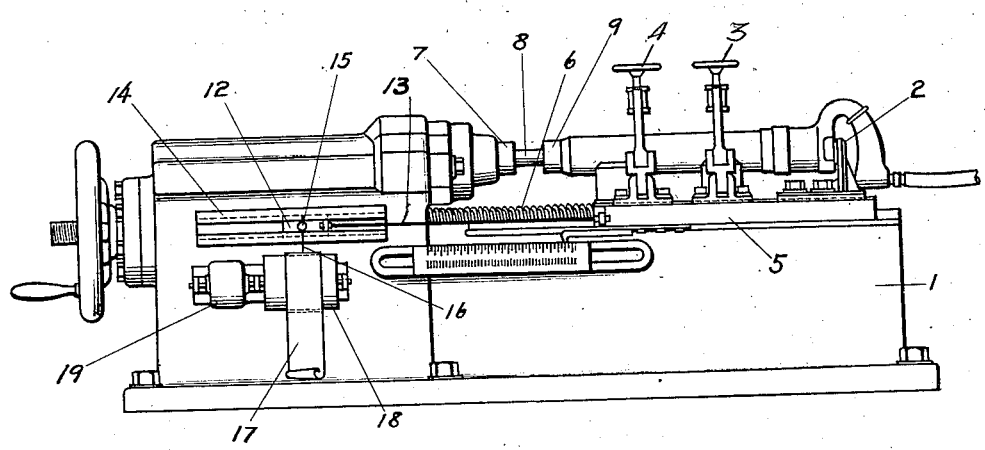
Fig. 3 shows in elevation the general arrangement of an equipment constructed according to this invention, as applied for the ascertaining of the number of blows and the intensity of recoils of a pneumatic hammer, as well as measuring the effective horse power.

In Figs. 1 and 2, on a part of a frame 1 is mounted a pushing plate 2 which is made to be moved only in the direction parallel to the axial line of the hammer to be tested, the back of which is always in close contact with the pushing plate 2 in order to check the recoil action of the hammer and propel it forward while it is in operation; hammer holders 3 and 4 are also arranged to move together with the hammer body in the direction above-mentioned, while gripping fast and supporting the body of the hammer.

A movable block 9 is slidably arranged at the end of the hammer cylinder so as to be movable only in the direction of the central axis of the hammer, and is also utilized as the snap of the hammer, while a fixed block 7 is firmly fixed on the frame 1 opposite to the movable block 9.

A test piece 8 is inserted between these two blocks 7 and 9 in such a way that it is deformed by the blows of the hammer through the movable block 9 during a predetermined period of time.

The pushing plate 2 and the hammer holders 3 and 4 are firmly fixed to a sliding plate 5 which is also movable in the direction parallel to the axial line of the hammer along a guide carried by the frame 1.

The pushing plate 2 and the hammer holders 3 and 4 mounted in the above-described manner may be drawn, together with the hammer to be tested, towards the test piece 8 by means of a spring 6, one end of which is connected with the sliding plate 5 while the other end is connected with a feed screw 10.

The tension of the spring 6 can be regulated through the manipulation of a handle 11 through which the feed screw 10 passes.

To work the testing equipment, a test piece is fitted to the equipment by inserting it between the fixed block 7 and the movable block 9 as stated above, the movable block 9 being fitted in the end of the cylinder of the hammer to be tested; moreover the body of the hammer is held fast by the hammer holders 3 and 4 while its rear is pressed by the pushing plate 2. The pressure of the pushing plate upon the hammer is adjusted to a proper degree by the regulation of the elongation of the spring 6 by means of the handle 11.

Thus prepared, the hammer is made to work continuously for a predetermined period of time against the test piece by supplying compressed air throughout this period.

The resulting change in the form of the test piece is equivalent to the total amount of useful work actually exerted by the hammer while it was operating; therefore, the effective horse power or the useful work done by the hammer may be determined by a comparison with a stress and strain diagram made by testing a test piece of the same size and of equal quality which was not subjected to the hammering operation, in an ordinary universal testing machine.

Figure 5:
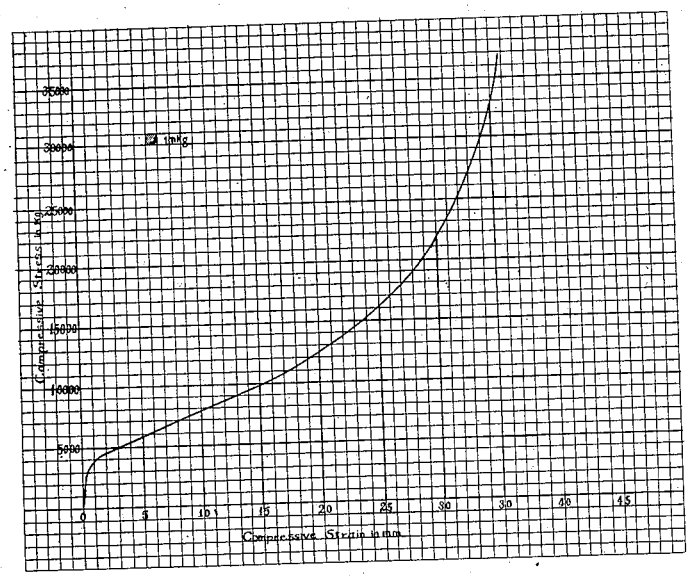
Fig. 5 shows a compressive stress and strain diagram of an aluminum test piece.

The compressive stress and strain diagram shown in Fig. 5 of the drawings is made by applying a gradually increasing compressive load to a cylindrical test piece which is 50 millimeters long and 25.4 millimeters in diameter.

The test piece is made of aluminum rolled bar and is tested in a usual universal testing machine.

In the diagram shown in Fig. 5 the load on the test piece is shown as a function of the deformation of said test piece.

The amount of work used in producing a certain deformation can be easily calculated from the load-deformation diagram.

Figure 6:
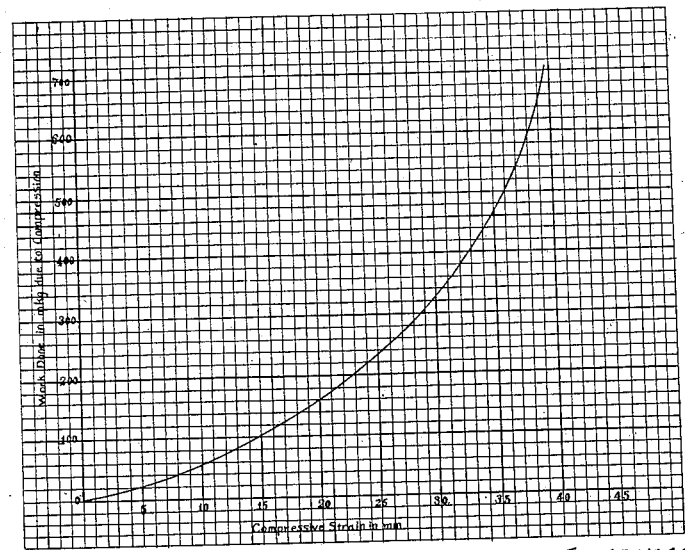
Fig. 6 is a similar diagram representing work as a function of deformation.

The diagram calculated from the diagram in Fig. 5 and representing the work as a function of the deformation is shown in Fig. 6 of the drawings.

The curve traced in Fig. 6 represents the relationship between certain deformation values and the amount of effective work expended to produce these deformations.

In the effective horse power chart shown in Fig. 7 the abscissæ represent the time during which the compressive load has been applied to the test piece, while the ordinates represent the total work used in deforming the test piece during the above time.

By calculating the horse power it is easily possible to obtain the corresponding horse power lines.

Moreover, from the relation between the work and strain of the test piece shown in the work-strain diagram (Fig. 6) the length of the deformed test piece can be easily graduated as illustrated in Fig. 7.

The above-mentioned method can be easily applied to tension test pieces, as well as compression test pieces.

When a test piece of the same size and quality as herein described is deformed by a gradually increasing load during a certain period of time, the effective horse power (which is equal to the total amount of work spent to deform said test piece divided by the amount of work per horse power) will be found on the chart shown in Fig. 7 without any calculation whatever, merely by determining a point on the chart which corresponds to the working time and the length of the deformed test piece.

If, instead of using an ordinary testing machine, a pneumatic hammer is employed for imparting blows to a test piece and for deforming the same, during a predetermined period of time, the resulting change in the form of the test piece will correspond to the total amount of effective work performed by the hammer while it was in operation.

The effective horse power of the hammer, or the effective work exerted in a certain unit of time, may be determined from the chart which is shown in Fig. 7 and which is obtained from an ordinary testing machine, provided that the test pieces of the same size and of equal quality were used in the testing machine and while testing the hammer.

Moreover, the intensity of blows of a pneumatic hammer or the effective work exerted by a single blow of it may be determined by finding the amount of work spent to produce the deformation of the test piece divided by the total number of blows used to produce this deformation, while the number of blows may be easily determined by a method which will be explained hereinafter.

The use of the testing equipment makes it readily possible to test simultaneously the effective horse power of a large number of pneumatic hammers, since any number of the test pieces of the same size and of equal quality are available; besides, a single sheet of stress and strain diagram, as well as a horse power chart, serve equally for all the test pieces used.

The materials to be used for the test pieces are selected from those having remarkable ductile or malleable quality and very low yielding point, such as, for example gold, silver, zinc, lead, tin, aluminum, copper or any other special alloys.

Figure 4:
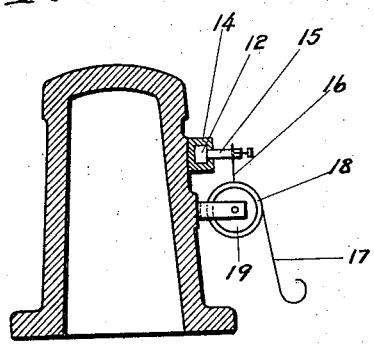
Fig. 4 shows a side sectional view of the recording instrument.

The number of blows and the intensity of recoils of a pneumatic hammer, as well as the effective horse power, may be easily determined by the testing device shown in Figs. 3 and 4.

This device is provided with a recording instrument which is arranged in such a way that a diagram of the oscillating motion of the hammer body caused by its recoil action may be clearly traced on a record sheet as a function of time, while the other parts except the above recording instrument are the same as those of the testing device shown in Figs. 1 and 2.

In Fig. 3 of the drawings, a piece 12 is rigidly connected with the sliding plate 5 by a coupling bar 13, and is slidably fitted in a guide plate 14 fixed on the frame 1, so that it can be moved to and fro together with the sliding plate 5 in the direction parallel to the axial line of the hammer.

The piece 12 has an arm 15 fastened thereon, and a stylus 16 is fitted on the arm 15.

A recording sheet 17 which is always in contact with the bottom of the stylus 16 is automatically moved by a turning drum 18 of cylindrical shape, rotating at a constant speed by a small motor 19, the axis of rotation of the turning drum 18 being parallel to the axial line of the hammer for the purpose of moving the record sheet 17 in a direction at right angles to that of the motion of the stylus 16.

When a hammer is operated on the device shown in Fig. 3 in the same manner as heretofore described in relation to the testing device shown in Fig. 1 and Fig. 2, the sliding plate 5 is oscillated together with the hammer body by its recoil action, only in the direction of its axial line; this oscillation takes place at regular intervals identical with those of the blows of the hammer although the blows occur at a high frequency.

The motion of the sliding plate 5 is caused by the fact that the pushing plate 2 suitably propels forward the body of the hammer; its recoil action is checked since the pushing plate 2 is firmly fixed to the sliding plate 5 which is continuously pulled in the direction of the blows of the hammer by means of the spring 6. The actions of the recoil and the blow of a pneumatic hammer alternate with each other very punctually.

The piece 12 provided with an arm 15 also moves in the same manner together with the sliding plate 5.

Consequently, the diagram of the motion of the hammer body, which is identical with that of the arm 15 can be automatically traced by the stylus 16 on the record sheet 17 which moves at a constant speed, so that the oscillating motion of the body of the hammer is shown as a function of time. At this time, the gradual creeping of the arm 15 caused by the deforming action of the test piece 8 does not prevent the tracing of the diagram of the motion of the hammer body since that creeping is slow enough for such tracing.

As is well known, the parts of the mechanism of the pneumatic hammer are all contained within the wall of the hammer cylinder, and moreover are all rectilinearly reciprocating in the direction parallel to the axial line of the hammer.

These facts preclude the use of a dynamometer and a tachometer and also place difficulties for the use of an indicator to ascertain the effective horse power or the useful work done in a certain unit of time by the hammer, so that so far no adequate machine or device has been provided which determines the effective horse power, the intensity of blows, the efficiency, or the number of blows and the intensity of recoils of the pneumatic hammer.

All these difficulties are eliminated by the present invention which makes it possible to determine easily and quickly all the above-mentioned factors.

Furthermore, the idea of the present invention can also be directly applied for testing of a rock drill with equal facility.

The illustrated modification is described by way of example only, and various changes may be made therein within the scope of the appended claim.

I claim:

A pneumatic hammer testing machine, comprising in combination a frame work, means slidably mounted on said frame work and adapted to carry the pneumatic hammer to be tested, said slidable means being movable along with the body of said hammer, manually variable spring pressure means connected at one end to said slidable means and at its other end to said frame work and adapted to propel said hammer in the direction of its blows through said slidable means, a fixed block fixed to said frame work, a movable block arranged between said fixed block and said hammer, a deformable test piece disposed between said two blocks and adapted to receive the blows of said hammer through said movable block, a stylus connected to said slidable means and adapted to be moved together with said slidable means, and a record sheet movable in contact with said stylus at an angle to the direction of motion of said stylus, whereby the movement of said stylus on said record sheet is traced.

TATSUMI TAKAHASHI.